US006567897B2

(12) United States Patent
Lee et al.

(10) Patent No.: US 6,567,897 B2
(45) Date of Patent: May 20, 2003

(54) VIRTUALIZED NVRAM ACCESS METHODS TO PROVIDE NVRAM CHRP REGIONS FOR LOGICAL PARTITIONS THROUGH HYPERVISOR SYSTEM CALLS

(75) Inventors: Van Hoa Lee, Cedar Park, TX (US); Kanisha Patel, Cedar Park, TX (US); David R. Willoughby, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 09/798,292

(22) Filed: Mar. 1, 2001

(65) Prior Publication Data

US 2002/0129212 A1 Sep. 12, 2002

(51) Int. Cl.$^7$ ................................................ G06F 12/00
(52) U.S. Cl. ........................ 711/153; 711/152; 711/163; 711/203; 709/1
(58) Field of Search .............................. 711/152, 153, 711/167, 170–173, 129–130, 133, 164, 154, 203; 709/1; 365/189.05

(56) References Cited

U.S. PATENT DOCUMENTS

| | | | | |
|---|---|---|---|---|
| 3,742,458 A | * | 6/1973 | Inoue et al. ................ | 711/154 |
| 4,564,903 A | | 1/1986 | Guyette et al. ............. | 364/300 |
| 4,843,541 A | | 6/1989 | Bean et al. ................. | 364/200 |
| 5,210,844 A | * | 5/1993 | Shimura et al. ............ | 711/153 |
| 5,287,473 A | * | 2/1994 | Mohan et al. .............. | 711/133 |
| 5,345,590 A | | 9/1994 | Ault et al. .................. | 395/650 |
| 5,396,461 A | * | 3/1995 | Fukumoto ............... | 365/189.05 |
| 5,819,061 A | * | 10/1998 | Glassen et al. ............. | 709/1 |
| 5,848,435 A | * | 12/1998 | Brant et al. ................ | 711/152 |
| 6,219,771 B1 | * | 4/2001 | Kikuchi et al. ............ | 711/164 |
| 6,233,667 B1 | * | 5/2001 | Shaylor et al. ............ | 711/203 |
| 6,292,874 B1 | * | 9/2001 | Barnett ..................... | 711/153 |

OTHER PUBLICATIONS

IBM Technical Disclosure Bulletin, vol. 39, No. 12, Dec. 1996, "Hypervisor High Performance Synchronous Dispatch for Coupled Systems", one page.
IBM Technical Disclosure Bulletin, vol. 38, No. 04, Apr. 1995, "VM MPG Operating as a DRF Hypervisor as a First Level Guest Under PR/SM", p. 325.
IBM Technical Disclosure Bulletin, vol. 36, No. 03, Mar. 1993, "Sharing Read–Only Memory among Multiple Logical Partitions", pp. 303–304.
IBM Technical Disclosure Bulletin, vol. 39, No. 12, Dec. 1996, "Highly Parallel Coupling Facility Emulator/Router with Shadowed Link Buffers", 2 pages.
IBM Technical Disclosure Bulletin, vol. 39, No. 06, Jun. 1996, "Coordinating Multiple Server Partitions to Enter Power–Save State", pp. 235–239.

* cited by examiner

Primary Examiner—Do Hyun Yoo
Assistant Examiner—Nasser Moazzami
(74) Attorney, Agent, or Firm—Duke W. Yee; Mark E. McBurney; Lisa L. B. Yociss

(57) ABSTRACT

A method, system, and computer program product for enforcing logical partitioning of a shared device to which multiple partitions within a data processing system have access is provided. In one embodiment, a firmware portion of the data processing system receives a request from a requesting device, such as a processor assigned to one of a plurality of partitions within the data processing system, to access (i.e., read from or write to) a portion of the shared device, such as an NVRAM. The request includes a virtual address corresponding to the portion of the shared device for which access is desired. If the virtual address is within a range of addresses for which the requesting device is authorized to access, the firmware provides access to the requested portion of the shared device to the requesting device. If the virtual address is not within a range of addresses for which the requesting device is authorized to access, the firmware denies the request.

27 Claims, 3 Drawing Sheets

100 DATA PROCESSING SYSTEM

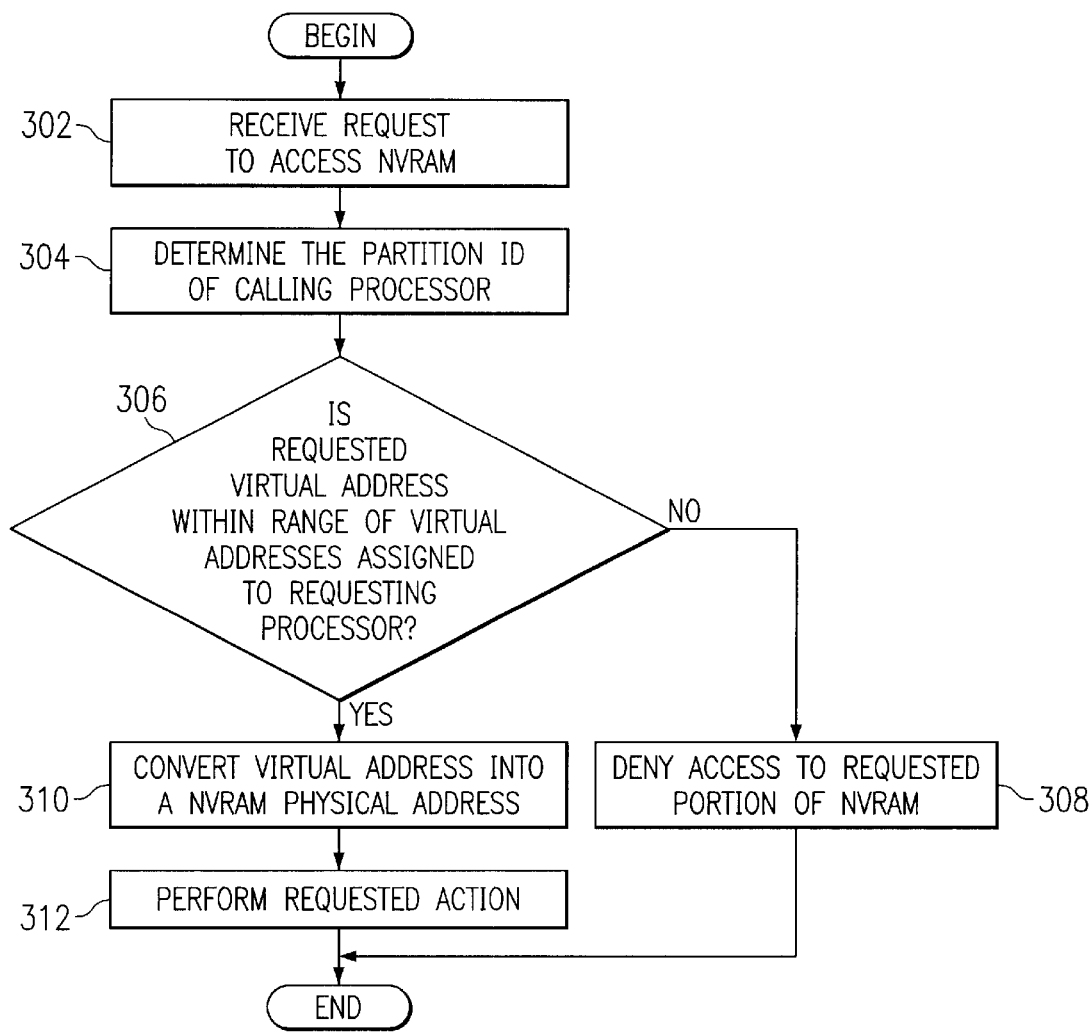

VIRTUALIZED NVRAM ACCESS METHODS TO PROVIDE NVRAM CHRP REGIONS FOR LOGICAL PARTITIONS THROUGH HYPERVISOR SYSTEM CALLS

BACKGROUND OF THE INVENTION

1. Technical Field

The present invention relates generally to an improved data processing system and, more particularly, to an improved logically partitioned data processing system. Still more particularly, the present invention relates to an improved non-volatile random access memory access for logically partitioned data processing systems.

2. Description of Related Art

A logical partitioning (LPAR) functionality within a data processing system (platform) allows multiple copies of a single operating system (OS) or multiple heterogeneous operating systems to be simultaneously run on a single data processing system platform. A partition, within which an operating system image runs, is assigned a non-overlapping sub-set of the platform's resources. These platform allocable resources include one or more architecturally distinct processors with their interrupt management area, regions of system memory, and I/O adapter bus slots. The partition's resources are represented by the platform's firmware to the OS image.

Each distinct OS or image of an OS running within the platform are protected from each other such that software errors on one logical partition cannot affect the correct operation of any of the other partitions. This is provided by allocating a disjoint set of platform resources to be directly managed by each OS image and by providing mechanisms for ensuring that the various images cannot control any resources that have not been allocated to it. Furthermore, software errors in the control of an OS's allocated resources are prevented from affecting the resources of any other image. Thus, each image of the OS (or each different OS) directly controls a distinct set of allocable resources within the platform.

Currently, some resources existing singly within the data processing system are shared by more than one partition. It would be desirable to have a mechanism by which these single resources may be logically partitioned and have the logical partitioning strictly enforced.

SUMMARY OF THE INVENTION

The present invention provides a method, system, and computer program product for enforcing logical partitioning of a shared device to which multiple partitions within a data processing system have access. In one embodiment, a firmware portion of the data processing system receives a request from a requesting device, such as a processor assigned to one of a plurality of partitions within the data processing system, to access (i.e., read from or write to) a portion of the shared device, such as an NVRAM. The request includes a virtual address corresponding to the portion of the shared device for which access is desired. If the virtual address is within a range of addresses for which the requesting device is authorized to access, the firmware provides access to the requested portion of the shared device to the requesting device. If the virtual address is not within a range of addresses for which the requesting device is authorized to access, the firmware denies the request.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 depicts a flowchart illustrating an exemplary method for enforcing logical partitioning within a non-volatile random access memory in accordance with the present invention.

DETAILED DESCRIPTION OF THE PREFERRED EMBODIMENT

Figure 1:
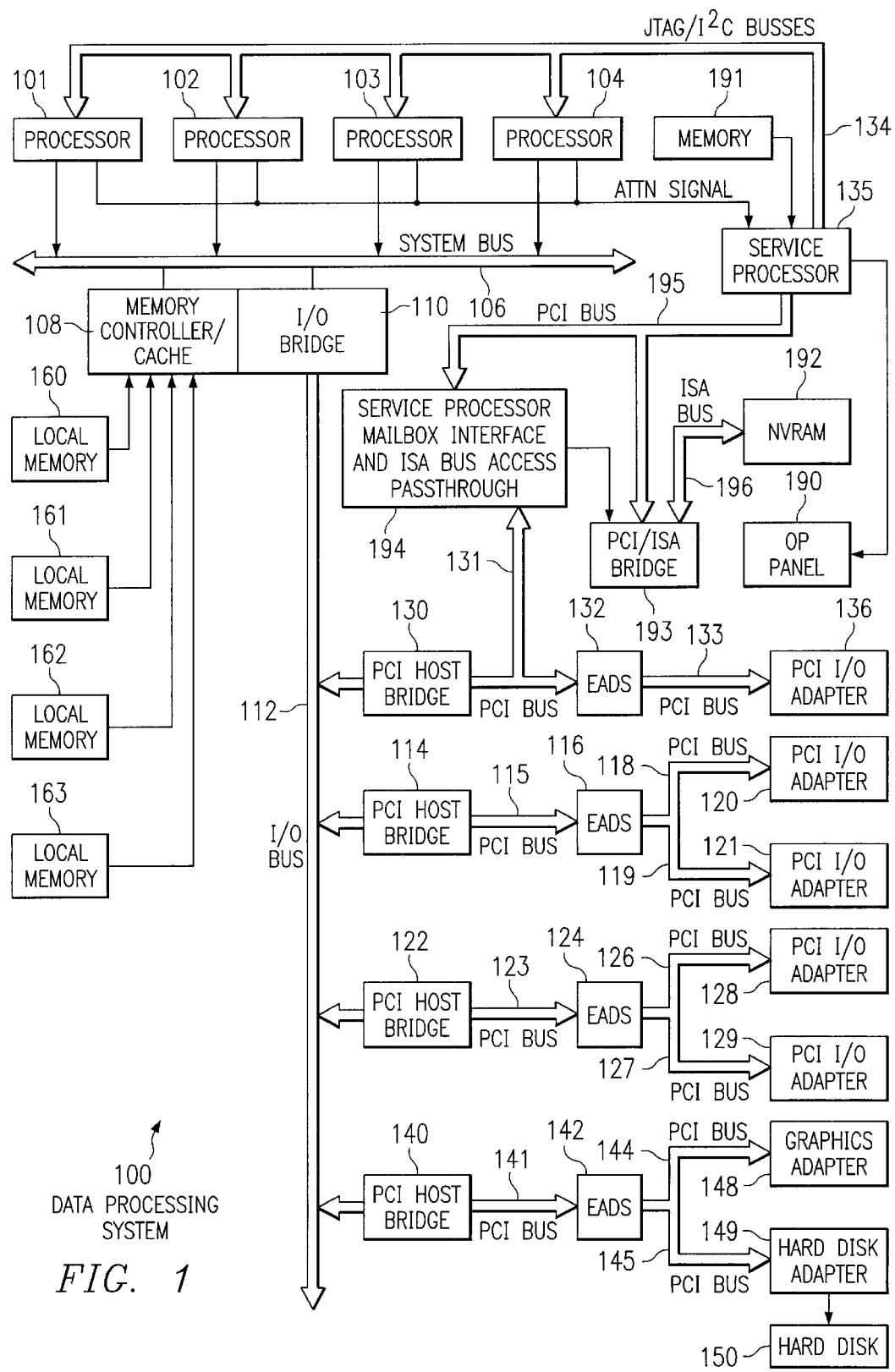
FIG. 1 depicts a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within in it. Data processing system 100 is logically partitioned such that different I/O adapters 120–121, 128–129, 136, and 148–149 may be assigned to different logical partitions. Furthermore, NVRAM 192 may be partitioned such that each partition may access and utilize only certain portions of NVRAM 192.

Thus, for example, suppose data processing system 100 is divided into three logical partitions, P1, P2, and P3. Each of I/O adapters 120–121, 128–129, 136, and 148–149, each of processors 101–104, and each of local memories 160–164 is assigned to one of the three partitions. For example, processor 101, memory 160, and I/O adapters 120, 128, and 129 may be assigned to logical partition P1; processors 102–103, memory 161, and I/O adapters 121 and 136 may be assigned to partition P2; and processor 104, memories 162–163, and I/O adapters 148–149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows 2000 operating system may be operating within logical partition P1. Windows 2000 is a product and trademark of Microsoft Corporation of Redmond, Wash.

Peripheral component interconnect (PCI) Host bridge 114 connected to I/O bus 112 provides an interface to PCI local bus 115. A number of Input/Output adapters 120–121 may be connected to PCI bus 115. Typical PCI bus implementations will support between four and eight I/O adapters (i.e. expansion slots for add-in connectors). Each I/O Adapter 120–121 provides an interface between data processing system 100 and input/output devices such as, for example, other network computers, which are clients to data processing system 100.

An additional PCI host bridge 122 provide an interface for an additional PCI bus 123. PCI bus 123 is connected to a plurality of PCI I/O adapters 128–129 by a PCI bus 126–127. Thus, additional I/O devices, such as, for example, modems or network adapters may be supported through each of PCI I/O adapters 128–129. In this manner, data processing system 100 allows connections to multiple network computers.

A memory mapped graphics adapter 148 may be connected to I/O bus 112 through PCI Host Bridge 140 and EADS 142 (PCI—PCI bridge) via PCI buses 141 and 144 as depicted. Also, a hard disk 150 may also be connected to I/O bus 112 through PCI Host Bridge 140 and EADS 142 via PCI buses 141 and 145 as depicted.

A PCI host bridge 130 provides an interface for a PCI bus 131 to connect to I/O bus 112. PCI bus 131 connects PCI host bridge 130 to the service processor mailbox interface and ISA bus access pass-through logic 194 and EADS 132. The ISA bus access pass-through logic 194 forwards PCI accesses destined to the PCI/ISA bridge 193. The NV-RAM storage is connected to the ISA bus 196. The Service processor 135 is coupled to the service processor mailbox interface 194 through its local PCI bus 195. Service processor 135 is also connected to processors 101–104 via a plurality of JTAG/I$^2$C buses 134. JTAG/I$^2$C buses 134 are a combination of JTAG/scan busses (see IEEE 1149.1) and Phillips I$^2$C busses. However, alternatively, JTAG/I$^2$C buses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware op-panel 190.

When data processing system 100 is initially powered up, service processor 135 uses the JTAG/scan buses 134 to interrogate the system (Host) processors 101–104, memory controller 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the system processors 101–104, memory controller 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (Host) memories 160–163. Service processor 135 then releases the Host processors 101–104 for execution of the code loaded into Host memory 160–163. While the Host processors 101–104 are executing code from respective operating systems within the data processing system 100, service processor 135 enters a mode of monitoring and reporting errors. The type of items monitored by service processor include, for example, the cooling fan speed and operation, thermal sensors, power supply regulators, and recoverable and non-recoverable errors reported by processors 101–104, memories 160–163, and bus-bridge controller 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
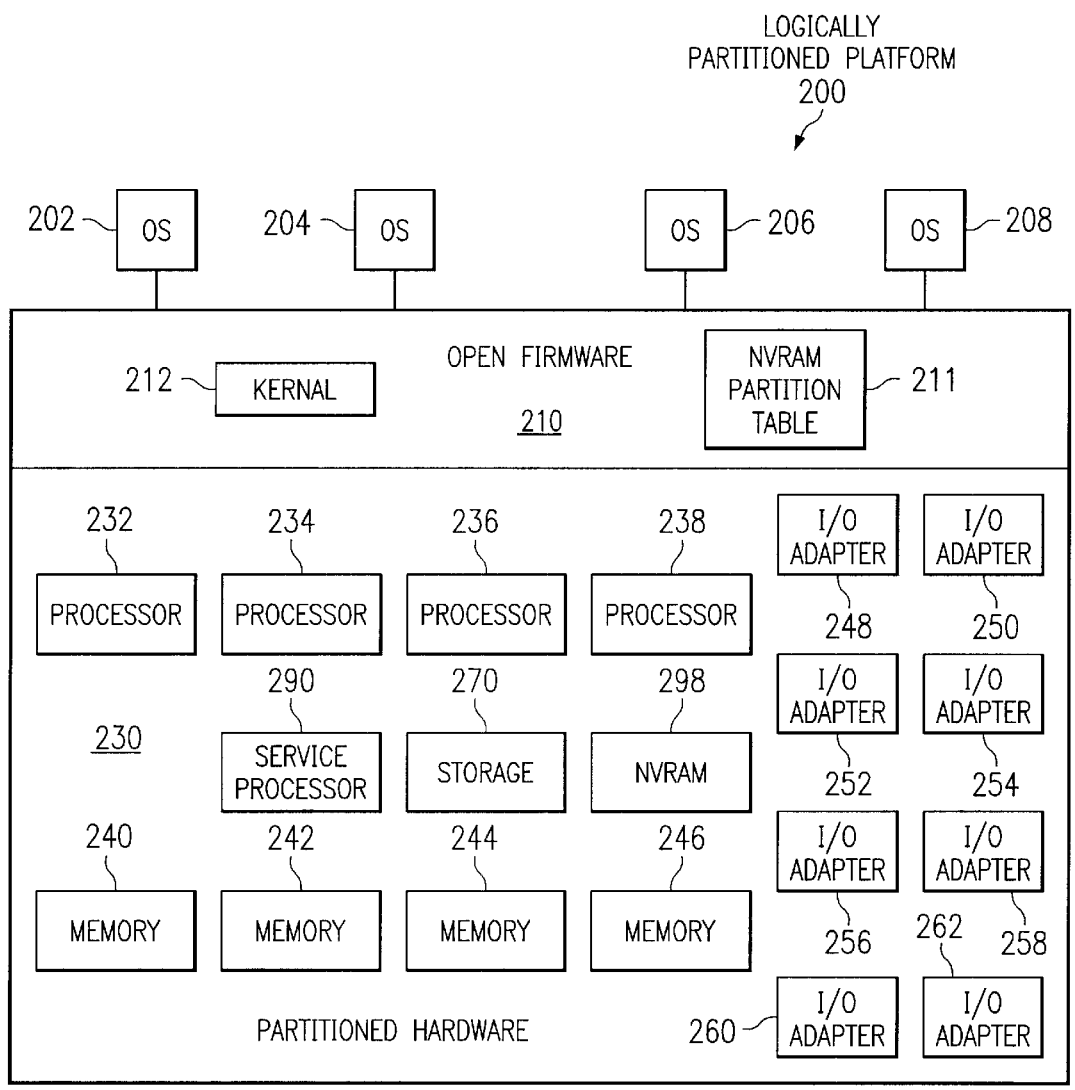
FIG. 2 depicts a block diagram of an exemplary logically partitioned platform in which the present invention may be implemented.

With reference now to FIG. 2, a block diagram of an exemplary logically partitioned platform is depicted in which the present invention may be implemented. The hardware in logically partitioned platform 200 may be implemented as, for example, server 100 in FIG. 1. Logically partitioned platform 200 includes partitioned hardware 230, Open Firmware (OF) 210, and operating systems 202–208. OF 210 is sometimes referred to as a hypervisor in some International Business Machine implementations. Operating systems 202–208 may be multiple copies of a single operating system or multiple heterogeneous operating systems simultaneously run on platform 200.

Partitioned hardware 230 includes a plurality of processors 232–238, a plurality of system memory units 240–246, a plurality of input/output (I/O) adapters 248–262, and a storage unit 270. Each of the processors 242–248, memory units 240–246, and I/O adapters 248–262 may be assigned to one of multiple partitions within logically partitioned platform 200, each of which corresponds to one of operating systems 202–208.

OF 210 performs a number of functions and services for operating system images 202–208 to create and enforce the partitioning of logically partitioned platform 200. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM).

OF 210 is a firmware implemented virtual machine identical to the underlying hardware. Thus, OF 210 allows the simultaneous execution of independent OS images 202–208 by virtualizing all the hardware resources of logically partitioned platform 200. OF 210 may attach I/O devices through I/O adapters 248–262 to single virtual machines in an exclusive mode for use by one of OS images 202–208.

Under logical partitioning, the common NVRAM 298 system resource is divided into several small Common Hardware Reference Platform (CHRP) regions, one for each of the partitions. CHRP is a platform system architecture, the goal of which is to support multiple Operating Systems on the same hardware platform. The CHRP architecture requires the system platform to provide a portion of NVRAM storage for the OS running on the system. The OS's NVRAM storage is said to be the CHRP NVRAM region. Since there is no hardware protection to detect unwanted accesses from one partition to another partition's NVRAM CHRP region, all accesses are performed through OF 210 system calls. OF 210 therefore provides a virtualized NVRAM CHRP region for all partitions. However, a partition with service authority may gain access to other NVRAM regions in addition to its own NVRAM CHRP region.

A normal partition has a virtualized NVRAM address range from zero to (chrp_size-1) with the CHRP region of chrp size bytes. The service authorized partition will have a virtualized NVRAM address range from zero to (chrp_size+auth_size-1) where chrp_size is CHRP region size in bytes and auth_size is Service Authority region size in bytes.

Any partition can issue NVRAM read/write accesses in its virtual address range. Accessing violating protection is enforced by OF 210 and any partition request for access to a virtual range outside the range allocated to the partition will be rejected by OF 210. For good accesses, the virtual NVRAM addresses are converted into real NVRAM addresses to read or write from or to the NVRAM 298.

OF 210 maintains a chip_base_address of each partition's CHRP region in NVRAM partition table 211. OF 210 uses the partition ID of the calling processor 234–238 to select the proper chrp_base_address of the partition's CHRP region. Therefore, for a normal partition, the actual physical NVRAM address (real_nvram_address) is given by the following equation:

real_nvram_addreess=partition_chrp_base_address+virtual_nvram_address

With the service_authorized partition, the NVRAM CHRP region and the service authority region may not be physically contiguous regions within NVRAM 298. If the virtual_nvram_address is greater than zero but less than the service_autho_partition_size, then the real_nvram_address is equal to the service_autho_base_address plus the virtual_nvram_address. Otherwise, if the service_autho_partition_size is less than or equal to the virtual_nvram_address and if the virtual_nvram_address is less than the chrp_size plus the service_autho_partition_size then the real_nvram_address is equal to (virtual_nvram_address−service_autho_partition_size+partition_chrp_base_address). Preferably, the service authority region is mapped before the partition's CHRP region. This allows the CHRP region to grow as needed.

With reference now to FIG. 3, a flowchart illustrating an exemplary method for enforcing logical partitioning within a non-volatile random access memory is depicted in accordance with the present invention. The present method may be implemented by, for example, OF 210 in FIG. 2. To begin, the OF receives a request to access the NVRAM from a processor within the data processing system (step 302). This request may be a request to read from a section of the NVRAM or a request to write to a section of the NVRAM and includes the virtual address or addresses of the portions of the NVRAM for which the processor desires access.

The OF then determines the partition Identification (ID) of the calling processor (step 304) and whether the requested virtual address or addresses are within the range of virtual addresses assigned to the partition to which the requesting processor belongs (step 306). If the virtual addresses are not within the range of virtual addresses assigned to the partition to which the processor belongs, then access to the requested portions of the NVRAM is denied (step 308). If, however, the requested virtual address or addresses are within the range of virtual addresses assigned to the partition to which the requesting processor belongs, then the virtual address or addresses is converted into a NVRAM physical address (step 310). The OF then performs the requested action (step 312) of either reading from or writing to the requested portions of the NVRAM.

The method illustrated herein is given merely by way of example. However, other methods may also be used to enforce the logical partitioning of the NVRAM. Furthermore, the principals of the present invention may be applied to other devices other than NVRAMs for which logical partitioning is desirable but which do not lend themselves to physical partitioning.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for enforcing logical partitioning of a shared device to which multiple partitions within a data processing system have access, the method comprising:

receiving a request from one of a plurality of processors to access a partition of the shared device, wherein the request includes a virtual address, ones of said plurality of processors being included in different ones of a plurality of partitions in said data processing system;

determining a partition identifier that is associated with said one of said plurality of processors, said partition identifier identifying one of said plurality of partitions which included said one of said plurality of processors;

utilizing said partition identifier to determine whether said one of said plurality of processors is authorized to access said virtual address; and responsive to a determination that said one of said plurality of processors is authorized to access said virtual address, providing access to the requested partition of the shared device to said one of said plurality of processors.

2. The method as recited in claim 1, further comprising:

responsive to a determination that said one of said plurality of processors is not authorized to access said virtual address, denying access to the requested partition of the shared device to said one of said plurality of processors.

3. The method as recited in claim 1, further comprising:
prior to receiving a request to access a partition of the shared device, assigning each of said plurality of partitions within the data processing system a range of virtual addresses wherein each virtual address corresponds to a physical address within the shared device.

4. The method as recited in claim 1, wherein the shared device is a non-volatile random access memory.

5. The method as recited in claim 1, wherein the determination as to whether said one of said plurality of processors is authorized to access said virtual address further comprises:
associating a different one of a plurality of ranges of virtual addresses with each one of said plurality of partitions of said data processing system;
identifying one of said plurality of partitions that is identified by said partition identifier;
identifying one of said plurality of ranges of virtual addresses that is associated with said identified one of said plurality of partitions;
determining whether said virtual address is within said identified one of said plurality of ranges of virtual addresses that is associated with said one of said plurality of partitions;
in response to a determination that said virtual address is within said identified one of said plurality of ranges of virtual addresses, determining that said one of said plurality of processors is authorized to access said virtual address; and
in response to a determination that said virtual address is not within said identified one of said plurality of ranges of virtual addresses, determining that said one of said plurality of processors is not authorized to access said virtual address.

6. The method as recited in claim 1, further comprising:
converting the virtual address into a physical address; and
performing the requested access.

7. The method as recited in claim 1, wherein the requested access is a read operation.

8. The method as recited in claim 1, wherein the requested access is a write operation.

9. The method according to claim 1, further comprising the steps of:
receiving, by firmware included within said data processing system, said request from said one of said plurality of processors;
determining, by said firmware, a partition identifier that identifies said one of said plurality of partitions that includes said one of said plurality of processors; and
utilizing, by said firmware, said partition identifier to determine whether said one of said plurality of processors is authorized to access said virtual address, wherein said determination is made by said firmware.

10. A computer program product in a computer readable media for use in a data processing system for enforcing logical partitioning of a shared device to which multiple partitions within the data processing system have access, the computer program product comprising:
instructions for receiving a request from one of a plurality of processors to access a partition of the shared device, wherein the request includes a virtual address, ones of said plurality of processors being included in different ones of a plurality of partitions in said data processing system;
instructions for determining a partition identifier that is associated with said one of said plurality of processors, said partition identifier identifying one of said plurality of partitions which included said one of said plurality of processors;
instructions for utilizing said partition identifier to determine whether said one of said plurality of processors is authorized to access said virtual address; and
instructions, responsive to a determination that said one of said plurality of processors is authorized to access said virtual address, for providing access to the requested partition of the shared device to said one of said plurality of processors.

11. The computer program product as recited in claim 10, further comprising:
instructions, responsive to a determination that said one of said plurality of processors is not authorized to access said virtual address, for denying access to the requested partition of the shared device to said one of said plurality of processors.

12. The computer program product as recited in claim 10, further comprising:
instructions, prior to receiving a request to access a partition of the shared device, for assigning each of said plurality of partitions within the data processing system a range of virtual addresses wherein each virtual address corresponds to a physical address within the shared device.

13. The computer program product as recited in claim 10, wherein the shared device is a non-volatile random access memory.

14. The computer program product as recited in claim 10, wherein the determination as to whether said one of said plurality of processors is authorized to access said virtual address further comprises:
instructions for associating a different one of a plurality of ranges of virtual addresses with each one of said plurality of partitions of said data processing system;
instructions for identifying one of said plurality of partitions that is identified by said partition identifier;
instructions for identifying one of said plurality of ranges of virtual addresses that is associated with said identified one of said plurality of partitions;
instructions for determining whether said virtual address is within said identified one of said plurality of ranges of virtual addresses that is associated with said one of said plurality of partitions;
instructions responsive to a determination that said virtual address is within said identified one of said plurality of ranges of virtual addresses, for determining that said one of said plurality of processors is authorized to access said virtual address; and
instructions responsive to a determination that said virtual address is not within said identified one of said plurality of ranges of virtual addresses, for determining that said one of said plurality of processors is not authorized to access said virtual address.

15. The computer program product as recited in claim 10, further comprising:
instructions for converting the virtual address into a physical address; and
instructions for performing the requested access.

16. The computer program product as recited in claim 10, wherein the requested access is a read operation.

17. The computer program product as recited in claim 10, wherein the requested access is a write operation.

18. The product according to claim 10, further comprising:

instructions for receiving, by firmware included within said data processing system, said request from said one of said plurality of processors;

instructions for determining, by said firmware, a partition identifier that identifies said one of said plurality of partitions that includes said one of said plurality of processors; and instructions for utilizing, by said firmware, said partition identifier to determine whether said one of said plurality of processors is authorized to access said virtual address, wherein said determination is made by said firmware.

19. A system in a computer readable media for use in a data processing system for enforcing logical partitioning of a shared device to which multiple partitions within the data processing system have access, the system comprising:

an access receiving unit which receives a request from one of a plurality of processors to access a partition of the shared device, wherein the request includes a virtual address, ones of said plurality of processors being included in different ones of a plurality of partitions in said data processing system;

determining means for determining a partition identifier that is associated with said one of said plurality of processors, said partition identifier identifying one of said plurality of partitions which included said one of said plurality of processors;

said partition identifier being utilized to determine whether said one of said plurality of processors is authorized to access said virtual address; and an address verification unit which, responsive to a determination that said one of said plurality of processors is authorized to access said virtual address, provides access to the requested partition of the shared device to said one of said plurality of processors.

20. The system as recited in claim 19, further comprising:

an access denial unit which, responsive to a determination that said one of said plurality of processors is not authorized to access said virtual address, denies access to the requested partition of the shared device to said one of said plurality of processors.

21. The system as recited in claim 19, further comprising:

a partitioning assignment unit which, prior to receiving a request to access a partition of the shared device, assigns each of said plurality of partitions within the data processing system a range of virtual addresses wherein each virtual address corresponds to a physical address within the shared device.

22. The system as recited in claim 19, wherein the shared device is a non-volatile random access memory.

23. The system as recited in claim 19, wherein the determination as to whether said one of said plurality of processors is authorized to access said virtual address further comprises:

associating means for associating a different one of a plurality of ranges of virtual addresses with each one of said plurality of partitions of said data processing system;

identification means for identifying one of said plurality of partitions that is identified by said partition identifier;

identification means for identifying one of said plurality of ranges of virtual addresses that is associated with said identified one of said plurality of partitions;

determining means for determining whether said virtual address is within said identified one of said plurality of ranges of virtual addresses that is associated with said one of said plurality of partitions;

in response to a determination that said virtual address is within said identified one of said plurality of ranges of virtual addresses, determining means for determining that said one of said plurality of processors is authorized to access said virtual address; and in response to a determination that said virtual address is not within said identified one of said plurality of ranges of virtual addresses, determining means for determining that said one of said plurality of processors is not authorized to access said virtual address.

24. The system as recited in claim 19, further comprising:

a conversion unit which converts the virtual address into a physical address; and an access performance unit which performs the requested access.

25. The system as recited in claim 19, wherein the requested access is a read operation.

26. The system as recited in claim 19, wherein the requested access is a write operation.

27. The system according to claim 19, further comprising:

firmware included within said data processing system for receiving said request from said one of said plurality of processors;

said firmware for determining a partition identifier that identifies said one of said plurality of partitions that includes said one of said plurality of processors; and said firmware for utilizing said partition identifier to determine whether said one of said plurality of processors is authorized to access said virtual address, wherein said determination is made by said firmware.

* * * * *